United States Patent [19]
Heembrock

[11] Patent Number: 5,870,156
[45] Date of Patent: Feb. 9, 1999

[54] SHADOW MASK FOR BACKLIT LCD

[75] Inventor: Peter Heembrock, Calgary, Canada

[73] Assignee: Northern Telecom Limited, Montreal, Canada

[21] Appl. No.: 709,457

[22] Filed: Sep. 5, 1996

[51] Int. Cl.[6] ................................................ G02F 1/1335
[52] U.S. Cl. ............................. 349/64; 349/65; 349/110; 349/142
[58] Field of Search ................................ 349/64, 58, 65, 349/67, 110, 113, 142; 40/448; 345/50, 38; 362/31

[56] References Cited

U.S. PATENT DOCUMENTS

| | | | |
|---|---|---|---|
| 4,206,501 | 6/1980 | Brooks | 362/293 |
| 4,514,920 | 5/1985 | Shafrir et al. | 349/113 |
| 4,656,466 | 4/1987 | Yoshida et al. | 345/4 |
| 4,673,254 | 6/1987 | Kato et al. | 362/297 |
| 4,770,499 | 9/1988 | Kobayashi et al. | 349/64 |
| 5,050,946 | 9/1991 | Hathaway et al. | 349/64 |
| 5,130,827 | 7/1992 | Pavone et a. | 349/68 |
| 5,189,537 | 2/1993 | O'Farrell | 349/113 |
| 5,269,977 | 12/1993 | Nakahashi et al. | 264/1.9 |
| 5,477,422 | 12/1995 | Hooker et al. | 362/29 |

*Primary Examiner*—William L. Sikes
*Assistant Examiner*—Tai V. Duong

[57] ABSTRACT

A backlit liquid crystal display device having company branding. The device includes a liquid crystal display, a diffuser panel with associated lighting means, and a reflector panel to re-direct light towards a viewing surface of the display. A pattern of dots or lines in the form of a company logo or trademark is strategically located so as to provide company branding of the display when operated in a backlit mode.

4 Claims, 3 Drawing Sheets

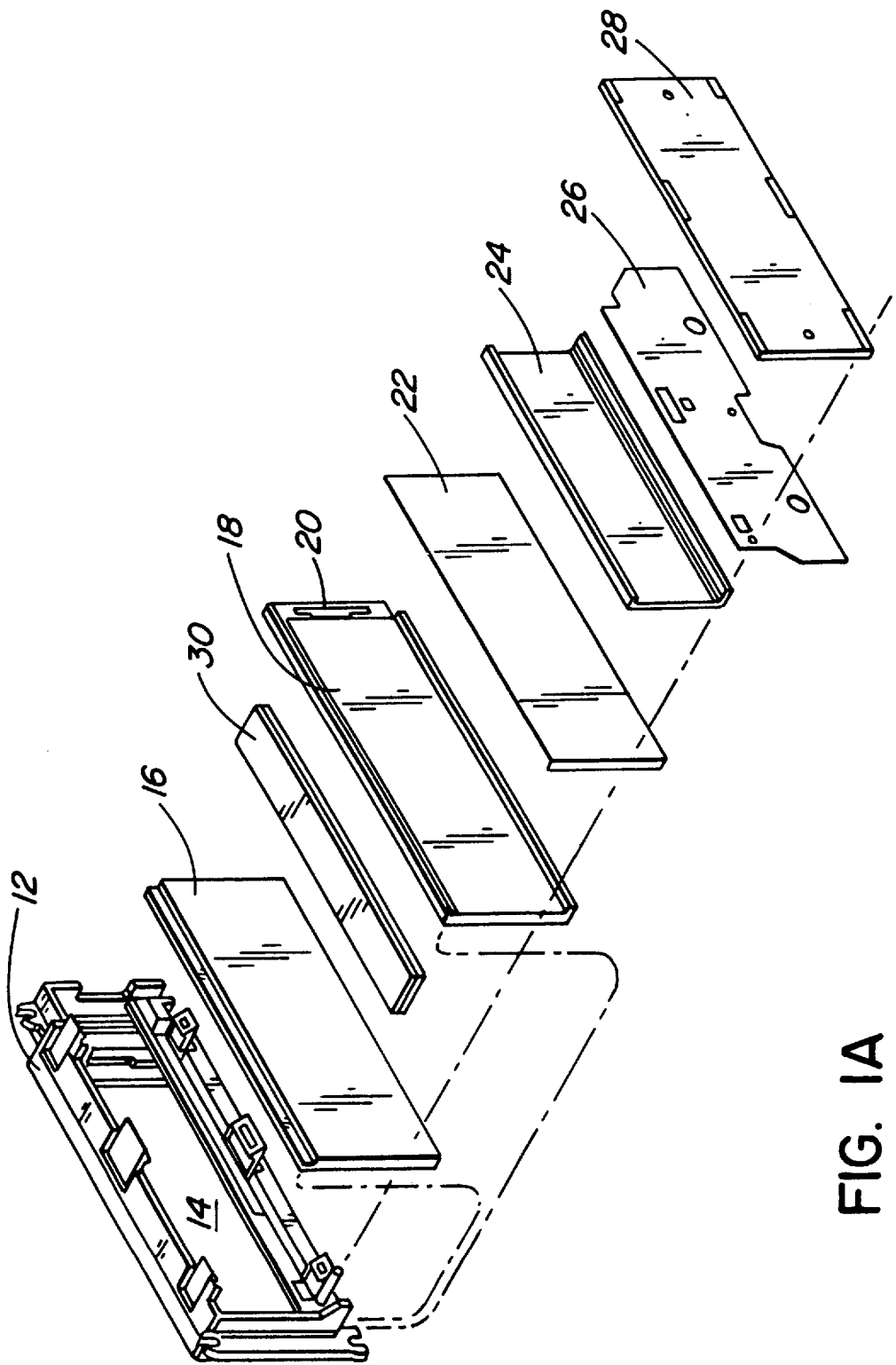
FIG. IA

SHADOW MASK FOR BACKLIT LCD

FIELD OF INVENTION

This invention relates to backlit liquid crystal display (LCD) assemblies and, more particularly, to such assemblies having shadow masks for displaying company logos and the like.

1. Background of Invention

Liquid crystal display (LCD) assemblies are commonly used in applications such as calculators, wrist watches, clocks and telephone terminals. They are particularly advantageous in battery operated devices in view of their low power requirements. Many of these applications, of course, require night viewing, in which case backlighting is optionally provided for selective operation.

Backlit LCD assemblies conventionally include a light source or sources associated with a light diffuser panel positioned behind the display. The light source or sources, for example, light emitting diodes, are positioned at one or more sides of the diffuser panel. The diffuser panel is intended to make use of internal light guiding to provide a more uniform backlit surface. The diffuser panel may also have a roughened or frosted surface to improve the uniformity of the backlighting.

2. Prior Art

The problem of uniformity in backlit LCD assemblies has been discussed in the prior art. In U.S. Pat. No. 4,206,501, issued Jun. 3, 1980, Brooks describes a diffusing backplate interposed between the light source and the display. The diffusing backplate, which is an exposed negative photographic film, has selectively darkened areas for attenuating light rays from the light source.

U.S. Pat. No. 4,673,254, which issued Jun. 16, 1987 to Kato et al, describes a back reflection type light diffusing assembly including a light guiding plate. The light guiding plate is provided with a light reflecting plate on the side opposite the radiation side. The light reflecting plate is provided with non-reflecting portions, the purpose of which is to improve the uniformity of the light radiating from the light guiding plate.

U.S. Pat. No. 5,477,422, which issued Dec. 19, 1995 to Hooker et al, describes a similar arrangement. In order to balance the backlighting provided by the diffuser panel, Hooker et al add light attenuating means to one face of the diffuser panel. The light attenuating means, in the form of a pattern of dots, are distributed over one surface of the diffuser panel to even out the light distribution.

The present invention utilizes the concept of light attenuating means associated with the diffuser panel to provide a shadow mask for displaying information to the viewer while the display is in a backlit mode.

SUMMARY OF THE INVENTION

It is an object of the present invention to provide a backlit LCD assembly having a shadow mask.

It is a further object of the invention to provide an LCD assembly wherein the shadow mask has a particular pattern.

It is a still further object of the present invention to provide an LCD assembly wherein the shadow mask pattern is a company logo for branding purposes.

Therefore, in accordance with a first aspect of the present invention there is provided a backlit liquid crystal display assembly comprising a liquid crystal display having a back face viewing face, a diffuser panel adjacent the back face, light means associated with the diffuser panel to selectively provide back lighting for the liquid crystal display, and a reflection panel associated with the diffuser panel, and an otherwise transparent film located between the diffuser panel and the reflection panel, the film having a pattern of non-reflecting regions which provide a corresponding pattern when the display assembly, in the backlit mode, is viewed from the viewing face.

In accordance with a second aspect of the invention there is provided a method of company branding a liquid crystal display device when operated in backlit mode, the device having a liquid crystal display, a diffuser panel having selectively operable lighting means, and a reflector panel associated with the diffuser panel to direct light toward the liquid crystal display, the method comprising: generating a shadow mask comprising a non-reflecting pattern corresponding to a company logo and locating the shadow mask in relation to the liquid crystal display such that the company logo is visible when the liquid crystal display is operated in backlit mode.

BRIEF DESCRIPTION OF THE DRAWINGS

The invention will now be described in greater detail with reference to the attached drawings wherein:

FIG. 1A is an exploded view of a display device assembly in accordance with a first embodiment of the invention;

DETAILED DESCRIPTION OF THE INVENTION

Figure 1B:
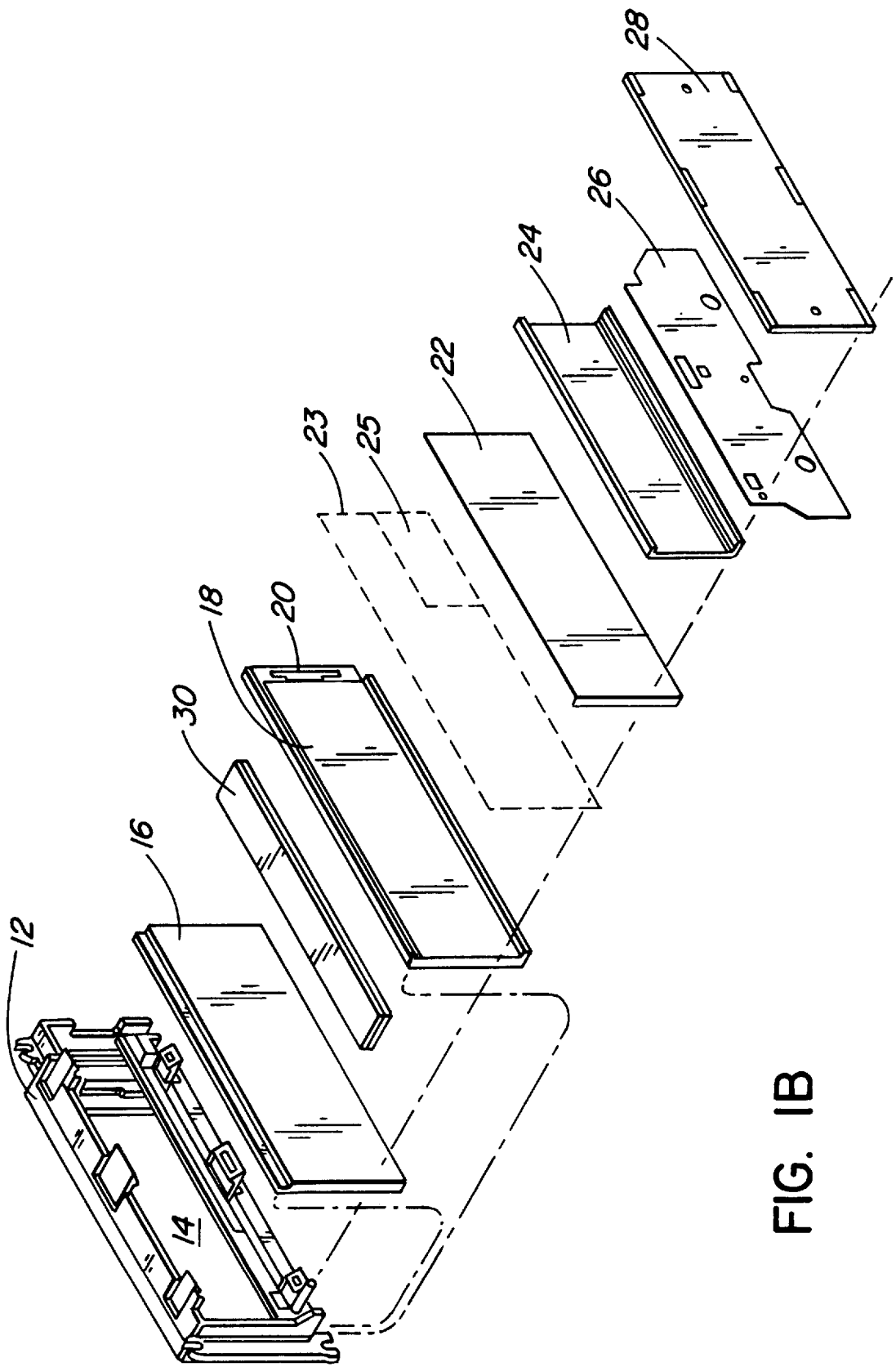
FIG. 1B is an exploded view of a display device assembly in accordance with a second embodiment of the invention.

FIGS. 1A and 1B show an assembly diagram of the display according to the present invention. These drawings relate to an implementation of the display in relation to a telephone terminal, it being understood that the concept of the invention is not limited to such an application, but can extend to any application involving a backlit LCD assembly.

In FIGS. 1A and 1B, the assembly includes front bezel 12, having opening 14 through which the display is viewed. Liquid crystal display 16, as is well known in the display art, includes display elements for displaying alpha numeric information such as time, date, telephone numbers, etc. Diffuser panel 18 provides back lighting for dark viewing. The diffuser panel has one or more light sources such as light emitting diodes 20 along one or more edges of the panel. The diffuser panel normally has a roughened face to provide a more uniform light surface. Reflector panel 22 positioned next to diffuser panel 18 reflects light from the diffuser panel forward towards the viewing surface. Reflector panel 22 is normally white or other strongly reflecting colour. A shadow mask shown as an outline 25 in FIG. 1B is imprinted on an otherwise transparent film 23 as will be described in greater detail later. The assembly also includes LCD holder 24, clip-on circuit board 28, and mylar panel 26. Circuit board 28 includes various conductor lines and circuit elements as is well known. Elastomer connector 30 provides conductor paths from circuit board 28 to LCD 16.

It is to be understood that clip-on circuit board 28, shown in FIGS. 1A and 1B, is not essential to operation of the assembly. Power and control signals can be supplied to the LCD and light sources by other means such as pigtails and/or connectors.

Reflector plate 22, as shown in FIGS. 1A and 1B, is intended to reflect light from the diffuser panel 18 forwardly towards the viewing plane. In this implementation, plate 22 has a smooth surface and a colour conducive to reflection of light. Normally the plate will be white but other reflecting colours are anticipated by the invention.

Figure 2:
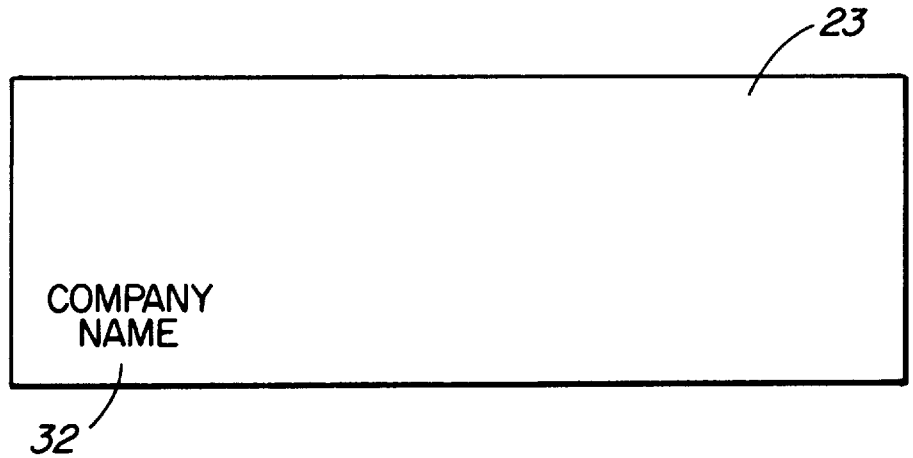
FIG. 2 is a plan view of the transparent film of FIG. 1B with branding text.

The shadow mask 32 as shown in FIG. 2 is a pattern of dots, lines, etc., of an opaque or non-reflecting material; it corresponds to the outline 25 shown in FIG. 1B. The shadow mask pattern 32 may take on any form which is desired to be seen in conjunction with the liquid crystal display when operated in the backlit mode. In a preferred embodiment the pattern is a company name, logo or trademark. This will allow the identity of the manufacturer of the product in which the display is incorporated to be visible to a viewer in a darkened environment. The pattern 32 may, of course, have other configurations depending on the application. These may be in the form of a reference grid, display line identifiers, etc.

When the pattern 32 is in the form of a company logo or trademark, it will optionally be located near the outer perimeter of the reflector plate 22 so as not to be obliterated by the display elements when in the operation mode. The pattern may, of course, be located elsewhere, particularly if it is intended to form part of the display format. It is also within the scope of the invention to locate the pattern directly behind the display elements of the LCD.

The pattern, as indicated, is formed by non-reflecting or opaque dots or lines on a surface between the diffuser panel 18 and the reflector plate 22. These may be formed by adding the dots or lines to the surface by silk-screening, evaporation through masks, or by many photographic or photolithographic techniques.

It is within the scope of the present invention to prepare the pattern on an otherwise transparent film and to cause the film carrying the pattern to adhere to the front surface of the reflector plate. This may be achieved utilizing photographic film or mylar film with the pattern imprinted thereon.

It is also within the scope of the invention to deposit or otherwise apply the opaque pattern directly to the underside or back side of the reflector panel.

Figure 3:
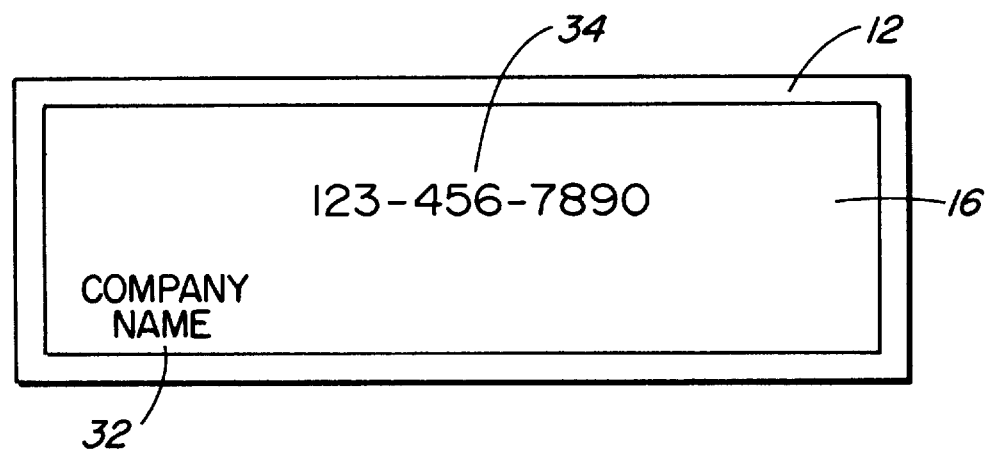
FIG. 3 is a front view of the display assembly.

FIG. 3 shows one example of an application of this invention in relation to a telephone terminal having a LCD for displaying caller identification 34 among other data.

While one embodiment of the invention has been described and illustrated, it will be apparent to one skilled in the art that many alternatives will be possible. It is intended, however, that such alternatives will fall within the scope of the invention as defined by the appended claims.

I claim:

1. A liquid crystal display device comprising, a liquid crystal display having a front viewing face and a back face, a diffuser panel adjacent said back face, light means associated with said diffuser panel to selectively provide back lighting for the liquid crystal display, a reflector panel associated with said diffuser panel to re-direct light from said diffuser panel towards said viewing face; and a pattern of non-reflecting regions which provide a corresponding visible pattern when the display, in a backlit mode, is viewed from the viewing face, said pattern of non-reflecting regions being formed on an otherwise transparent film located between the diffuser panel and the reflector panel.

2. A liquid crystal display device as defined in claim 1, said pattern of non-reflecting regions having an alpha-numeric format.

3. A liquid crystal display device as defined in claim 2, said patter of non-reflecting regions representing a company logo.

4. A method of company branding a liquid crystal display (LCD) device when selectively operated in backlit mode, said LCD device having a liquid crystal display, a diffuser panel with selectively operable lighting means, and a reflector panel associated with the diffuser panel to direct light from the lighting means to the liquid crystal display, the method comprising:

generating a shadow mask having a non-reflecting pattern corresponding to a company logo; and locating the shadow mask in the LCD device such that said company logo is visible when said LCD device is operated in backlit mode, wherein said shadow mask is contained on an otherwise transparent film placed between the diffuser panel and the reflector panel.

* * * * *